US007704626B2

(12) United States Patent
Van Benthem et al.

(10) Patent No.: US 7,704,626 B2
(45) Date of Patent: Apr. 27, 2010

(54) ISOLATED AND INSULATED STACK END UNIT INLET/OUTLET MANIFOLD HEADERS

(75) Inventors: Paul J Van Benthem, Canandaigua, NY (US); Jeffrey A Rock, Fairport, NY (US); Gerald W Fly, Geneseo, NY (US); Matthew J Beutel, Webster, NY (US)

(73) Assignee: GM Global Technology Operations, Inc.

( * ) Notice: Subject to any disclaimer, the term of this patent is extended or adjusted under 35 U.S.C. 154(b) by 1671 days.

(21) Appl. No.: 10/901,646

(22) Filed: Jul. 29, 2004

(65) Prior Publication Data

US 2006/0024559 A1 Feb. 2, 2006

(51) Int. Cl.
*H01M 2/14* (2006.01)
*H01M 2/08* (2006.01)

(52) U.S. Cl. ............................. 429/38; 429/35; 429/39
(58) Field of Classification Search ................. None
See application file for complete search history.

(56) References Cited

U.S. PATENT DOCUMENTS

| | | | | |
|---|---|---|---|---|
| 4,525,022 | A * | 6/1985 | Murray | ........................ 439/741 |
| 5,484,666 | A | 1/1996 | Gibb et al. | |
| 5,547,777 | A | 8/1996 | Richards | |
| 5,789,091 | A | 8/1998 | Wozniczka et al. | |
| 6,040,072 | A | 3/2000 | Murphy et al. | |
| 2003/0152819 | A1 * | 8/2003 | Hatoh et al. | ................... 429/32 |
| 2004/0175608 | A1 * | 9/2004 | Lisi et al. | ........................ 429/38 |
| 2005/0252892 | A1 | 11/2005 | Newman et al. | |
| 2005/0260479 | A1 * | 11/2005 | Raiser et al. | ................... 429/34 |

FOREIGN PATENT DOCUMENTS

| | | |
|---|---|---|
| CN | 1405916 | 3/2003 |
| EP | 0 444 383 A1 | 9/1991 |
| EP | 0444383 | 9/1991 |
| EP | 0 981 174 A2 | 2/2000 |
| EP | 0 981 175 | 2/2000 |
| EP | 0981174 | 2/2000 |
| JP | 61225779 | 10/1986 |
| JP | 08088018 | 4/1996 |
| JP | 11097054 A | 4/1999 |

OTHER PUBLICATIONS

International Search Report PCT/US05/20495 dated Feb. 16, 2007 corresponding to this application.

* cited by examiner

*Primary Examiner*—Dah-Wei D Yuan
*Assistant Examiner*—Kwang Han
(74) *Attorney, Agent, or Firm*—Harness, Dickey & Pierce, P.L.C.

(57) ABSTRACT

The present invention isolates the fluid streams flowing into and out of a fuel cell stack from the terminal plates so that the fluid streams and terminal plates do not come into contact with one another. The prevention of the fluid streams from contacting the terminal plate eliminates corrosion concerns associated with the terminal plate. The present invention accomplishes this isolation through the use of headers having fluid passageways therein that route the fluid streams in and/or out of the fuel cell stack while preventing contact between the fluid streams and the terminal plate.

29 Claims, 3 Drawing Sheets

ISOLATED AND INSULATED STACK END UNIT INLET/OUTLET MANIFOLD HEADERS

FIELD OF THE INVENTION

The present invention relates to fuel cell stacks and, more particularly, to inlet/outlet manifold headers within a fuel cell stack.

BACKGROUND OF THE INVENTION

Fuel cells have been and are proposed for use as a power source in many applications. A typical fuel cell assembly includes a plurality of individual fuel cells stacked one upon another to form a fuel cell stack which is held in compression. Typically, each fuel cell comprises an anode layer, a cathode layer, and an electrolyte interposed between the anode layer and the cathode layer. The fuel cell stack requires a significant amount of compressive force to squeeze the fuel cells of the stack together. The need for the compressive force comes about from the internal gas pressure of the reactants within the fuel cells plus the need to maintain good electrical contact between the internal components of the fuel cells.

To apply the compressive force, the fuel cell stack is positioned between a pair of rigid endplates that apply a compressive force on the fuel cell stack. Electrically conductive terminal plates are disposed between the endplates and the fuel cell stack and are used to conduct electrical current between the fuel cell stack and the system in which the fuel cell assembly is employed. The fuel cell stack requires gaseous reactants (anode reactant and cathode reactant) to be supplied to and removed from the fuel cell stack to produce electricity. A coolant flow is also provided to and removed from the fuel cell stack to keep the stack at a desired operating temperature. These gaseous reactants and coolant can be humid flows and are supplied to the fuel cell stack by manifold headers. The headers pass through one or both of the endplates and are sealed against the terminal plate. The gaseous reactants and coolant are supplied to the fuel cell stack via the headers. With the header seal being against the terminal plate, the humid fluids (gaseous reactants and/or coolant) are in contact with the terminal plate. Ambient conditions and the voltage (electrical potential), which is applied to the terminal plates, can create electrolysis and cause corrosion of the terminal plate. Corrosion of the terminal plate is undesirable because it could decrease the lifespan of the fuel cell assembly and also contaminate the streams flowing through the headers.

The terminal plates are made from a good conductor, (e.g., aluminum or copper) to facilitate the current flow between the fuel cell stack and the system in which the fuel cell assembly is employed. To protect the terminal plates against corrosion, various coatings have been used on the terminal plate. The coatings, however, can be expensive and cost prohibitive (e.g., made of gold). Additionally, the coatings can have a limited lifespan such that the life of the fuel cell assembly is reduced even with the use of the coatings. Furthermore, the coatings can be sensitive to minor damage, such as scratches, and result in poor performance or allowing the corrosion process to occur. Thus, an inexpensive way to inhibit and/or prevent corrosion of a terminal plate is desirable.

SUMMARY OF THE INVENTION

The present invention isolates the fluid streams flowing into and out of a fuel cell stack from the terminal plates so that the fluid streams and terminal plates do not come into contact with one another. The prevention of the fluid streams from contact in the terminal plate eliminates corrosion concerns associated with the terminal plate. By eliminating these corrosion concerns, expensive protective coatings are not needed on the terminal plate. The present invention accomplishes this isolation through the use of headers having fluid passageways therein that route the fluid streams in and/or out of the fuel cell stack while preventing contact between the fluid streams and the terminal plate.

In one aspect of the present invention, a fuel cell assembly is disclosed. The fuel cell assembly includes a plurality of fuel cells arranged adjacent one another to form a fuel cell stack. There is a terminal plate in electrically conductive contact with the fuel cell stack. The terminal plate is operable to conduct electrical current from the fuel cell stack. The terminal plate has an opening for transporting a fluid stream to or from the fuel cell stack. There is also an electrically non-conductive header that is sealingly engaged with the fuel cell stack. The header passes through the opening in the terminal plate. The header has a fluid transport passageway that allows the fluid stream to flow to or from the fuel cell stack through the opening in the terminal plate. The header prevents the fluid stream from contacting the terminal plate.

In another aspect of the present invention, a method of preventing a fluid stream flowing into a fuel cell stack through a terminal plate from contacting the terminal plate with the use of an electrically non-conductive header having a fluid passageway is disclosed. The method includes: (1) positioning the header in a through opening in the terminal plate with the header passageway passing through the opening in the terminal plate; (2) sealingly engaging the header passageway with the fuel cell stack; (3) routing a fluid stream from or to the fuel cell stack through the header passageway; and (4) isolating the fluid stream from the terminal plate with the header thereby preventing the fluid stream from contacting the terminal plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings,. wherein.

DETAILED DESCRIPTION OF THE PREFERRED EMBODIMENT

The following description of the preferred embodiment is merely exemplary in nature and is in no way intended to limit the invention, its application, or uses.

Figure 1:
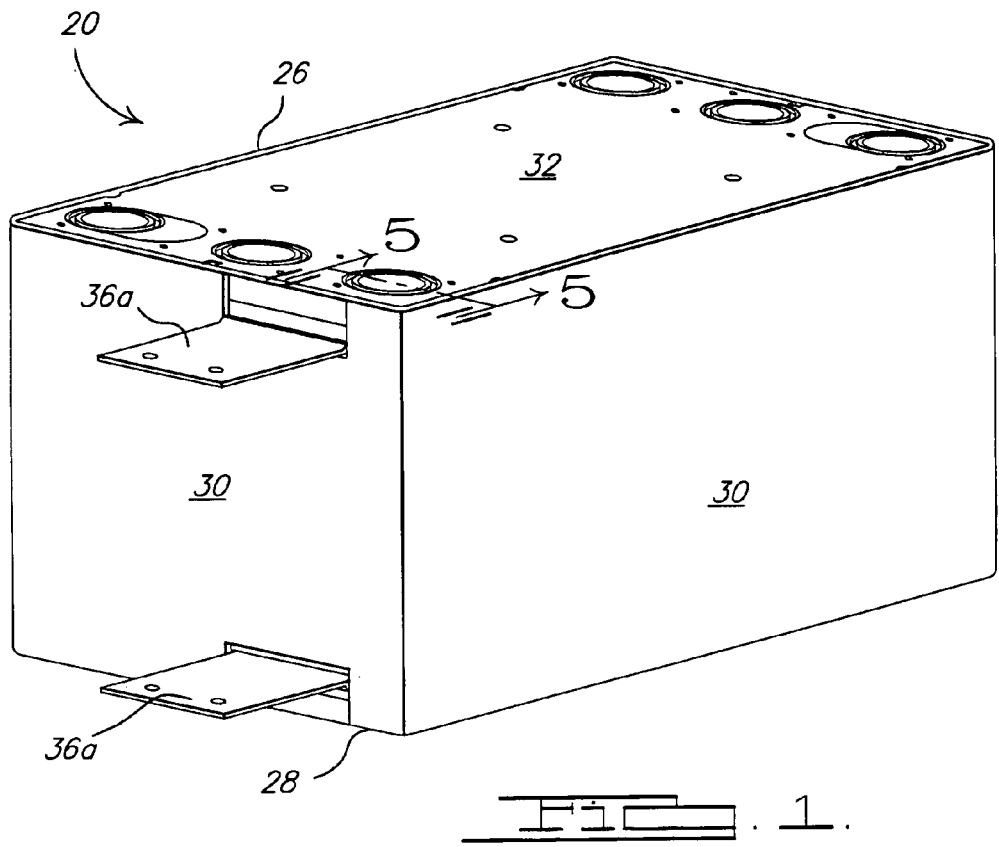
FIG. 1 is a simplified perspective view of a fuel cell assembly according to the principles of the present invention.

Referring to FIG. 1, there is shown a fuel cell assembly 20 according to the principles of the present invention. Fuel cell assembly 20 includes a plurality of fuel cells 22 (FIG. 5) arranged in a stacked configuration to form a fuel cell stack 24. The fuel cell stack 24 is interposed between upper and lower end assemblies 26, 28. Upper end assembly 26 is referred to as a wet end assembly because the fluid streams (cathode and anode reactants, cathode and anode effluents, and coolant) flow to or from fuel cell stack 24 through upper end assembly 26. In contrast, lower end assembly 28 is referred to as a dry end assembly because the fluid streams do not flow therethrough. End assemblies 26, 28 are discussed in more detail below. End assemblies 26, 28 are held in a fixed space relation by one or more side plates 30. Side plates 30 hold the upper and lower end assemblies 26, 28 in a spaced relation so that a compressive force is imparted on fuel cell stack 24. Other methods of imparting a compressive force, however, can be employed without departing from the scope of the present invention. Fuel cell assembly 20 is typically a part of a fuel cell system (not shown) that includes appropriate supply plumbing (not shown) for supplying cathode reactant (such as $O_2$ or air), anode reactant (such as hydrogen), and coolant that connect to wet end assembly 26 and flow therethrough to fuel cell stack 24 within fuel cell assembly 20. Similarly, the fuel cell system includes appropriate return plumbing (not shown) that connect to wet end assembly 26 and allow the cathode effluent, anode effluent and return coolant fluid streams to flow from fuel cell stack 24 to other components within the fuel cell system.

Figure 2:
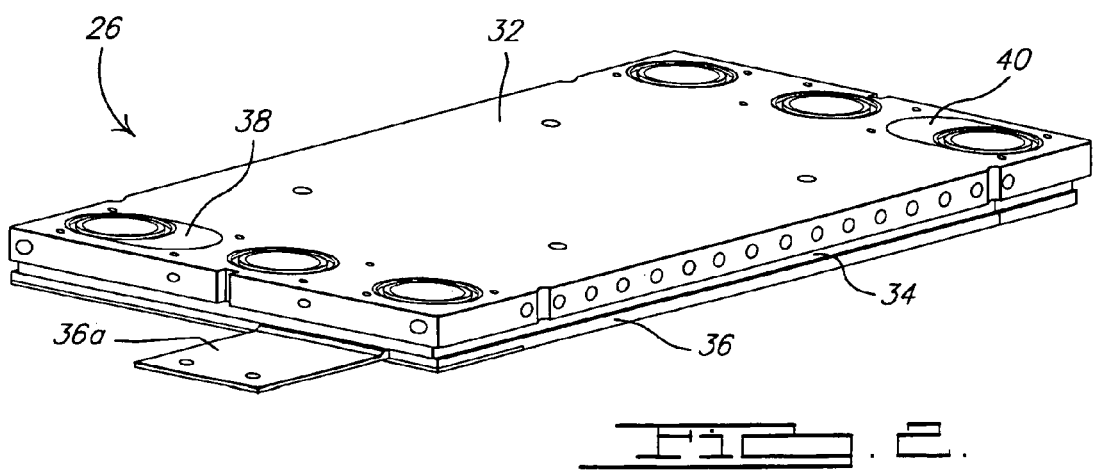
FIG. 2 is a simplified perspective view of the wet end assembly according to the principles of the present invention utilized in the fuel cell assembly of FIG. 1.
Figure 3:
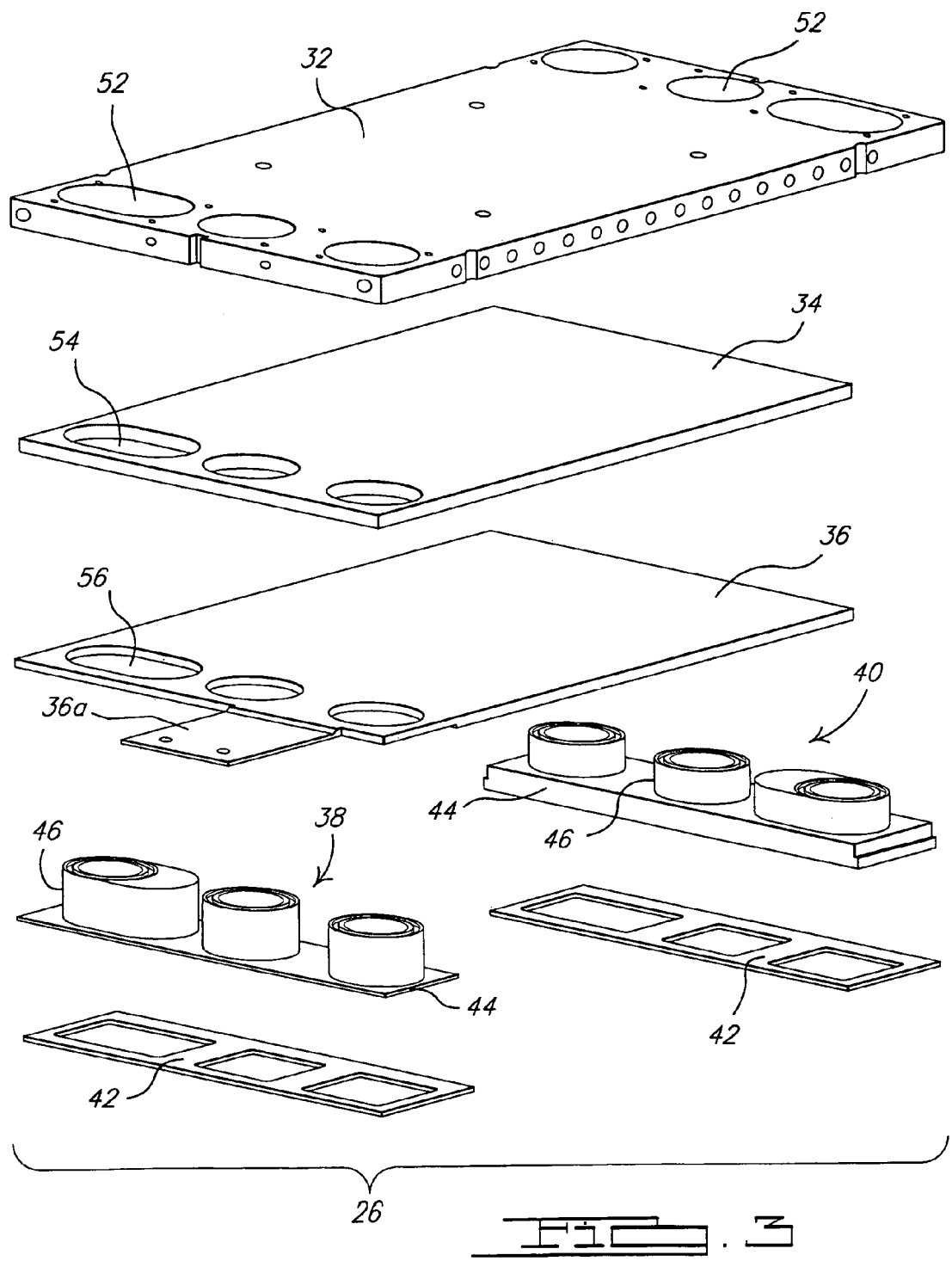
FIG. 3 is a simplified exploded perspective view of the wet end assembly of FIG. 2.
Figure 4A:
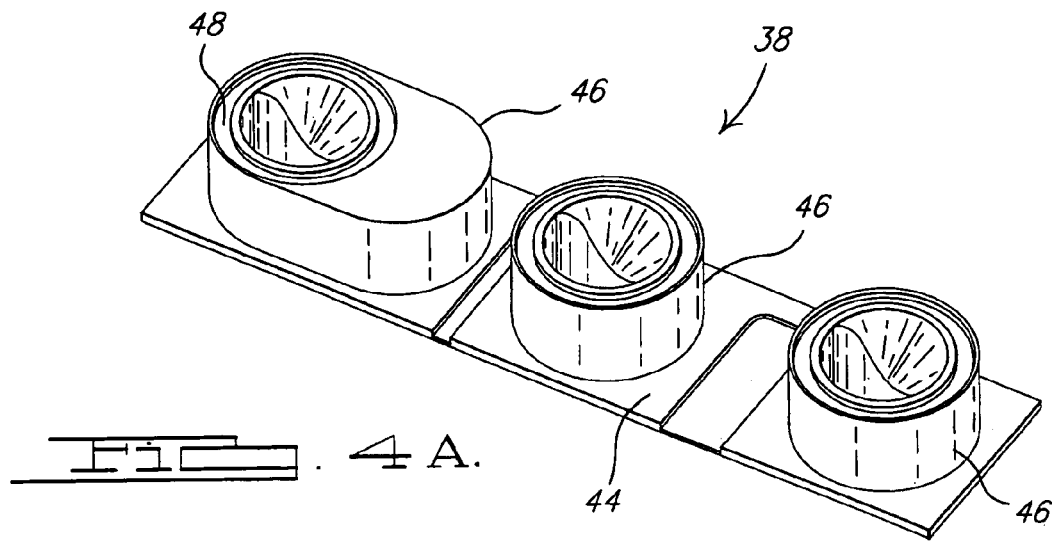
FIGS. 4A and B are perspective views of opposite sides of an isolated header according to the principles of the present invention and used in the wet end assembly of FIGS. 2 and 3.
Figure 4B:
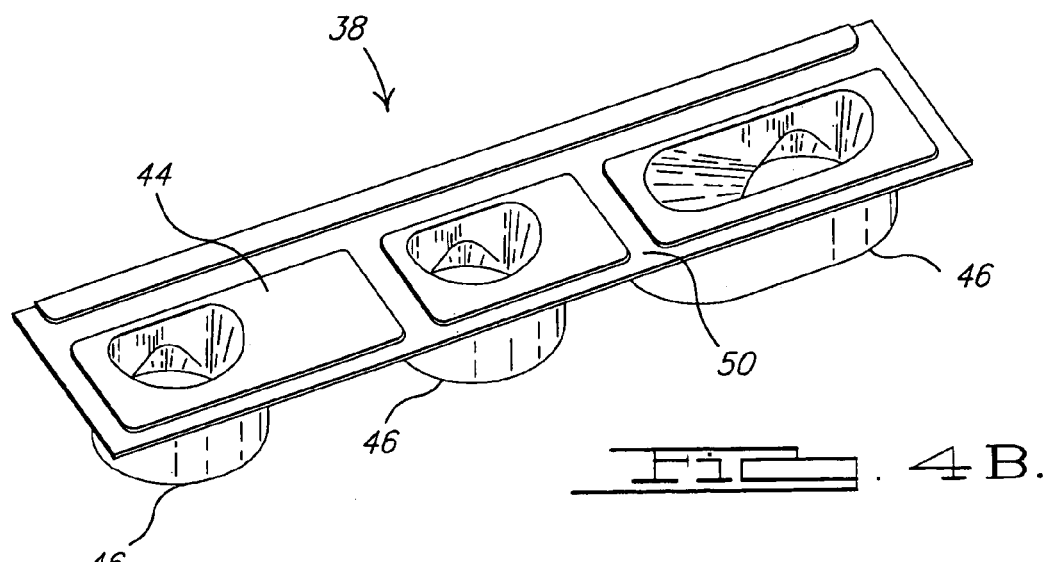
Figure 5:
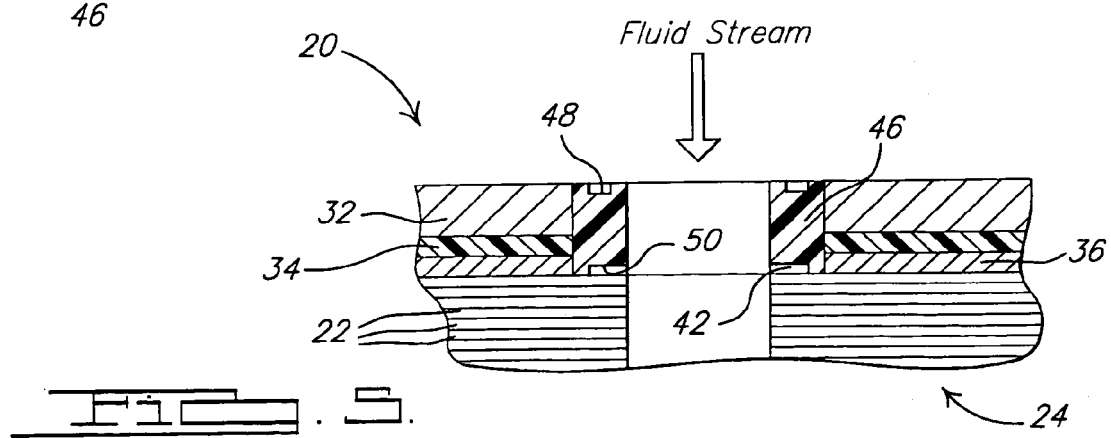
FIG. 5 is a partial cross-sectional view of the fuel cell assembly of FIG. 1, taken along line 5-5, showing the preferred embodiment of a fuel cell assembly according to the principles of the present invention.

Referring now to FIGS. 2 and 3, wet end assembly 26 is shown. Wet end assembly 26 includes an end plate 32, an insulator plate 34, a terminal plate 36, a pair of headers 38, 40 and a pair of gaskets or seals 42. Terminal plate 36 is positioned between insulator plate 34 and an end of fuel cell stack 24, as shown in FIG. 5. Terminal plate 36 conducts electrical current to/from fuel cell stack 24. Accordingly, terminal plate 36 is made from a highly conductive material capable of handling the current densities that will be encountered in the production of electricity by fuel cell assembly 20. For example, terminal plate 36 can be made from aluminum and be capable of handling a current density of about 8 A/$mm_2$ or greater depending upon the specific configuration and power output of fuel cell assembly 20. Terminal plate 36 has an extension 36a that extends through side plates 30 to facilitate the electrical connection of fuel cell assembly 20 to other components. Insulator plate 34 serves to isolate end plate 32 from terminal plate 36 so that electrical current flowing to/from fuel cell stack 24 does not flow through end plate 32. Accordingly, insulator plate 34 is made from an electrically non-conductive material.

Headers 38, 40 are non-conductive and operable to direct the fluid streams between fuel cell stack 24 and the supply/return plumbing (not shown) external to fuel cell assembly 20. To facilitate the routing of the fluid streams between fuel cell stack 24 and the plumbing, each header 38, 40 has a base 44 and a plurality of fluid transport passageways 46 that extend generally orthogonally from base 44. Each passageway 46 passes through wet end assembly 26 and is configured to direct a fluid stream between fuel cell stack 24 and the appropriate return or supply plumbing. Passageways 46 are sealingly engaged with fuel cell stack 24 and the appropriate plumbing so that fluid tight seals are formed therebetween. To facilitate this sealing engagement, each passageway 46 has a recessed channel 48 that is configured to accept a gasket or seal, such as an O-ring, to sealingly engage with the appropriate plumbing. Similarly, the opposite sides of each passageway 46 on the bottom of base 44 also have recessed channels 50 within which seals 42 are positioned to allow headers 38, 40 to be sealingly engaged with fuel cell stack 24.

Each passageway 46 extends from base 44 to an opposite side of wet end assembly 26. End plate 32 has a plurality of openings 52 through which passageways 46 extend. Passageways 46 of header 38 also extend through openings 54 in insulator plate 34 and through openings 56 in terminal plate 36. This is necessitated by the fact that extension 36a of terminal plate 36 extends out of fuel cell assembly 20 in that direction thus making terminal plate 36 and insulator plate 34 extend over the flow channels within fuel cell stack 24.

Headers 38, 40 operate to isolate terminal plate 36, insulator plate 34 and base plate 32 from the fluid streams flowing to and from fuel cell stack 26 through passageways 46. Passageways 46 prevent the fluid streams flowing therethrough from contacting terminal plate 36, insulator plate 34 and end plate 32. By preventing the fluid streams from contacting these plates, the problem of corrosion occurring on these plates as a result of contact with the fluid streams is avoided. By avoiding this fluid contact, terminal plate 36 does not need a protective coating, as done in the prior art, to protect against the contact with the fluid streams. Additionally, terminal plate 36 can now be coated with more desirable coatings, such as tin, to facilitate current collection and transport. Furthermore, the use of headers 38, 40 also facilitates the manufacture of the plates. Specifically, the openings 52, 54, 56 in the respective end plate 32, insulator plate 34 and terminal plate 36 can be generic openings that are easily machined in the plates. Headers 38, 40 can then have passageways 46 that have an external configuration that matches the openings and an internal configuration that corresponds to the shape of the flow headers within fuel cell stack 24 and the configuration of the supply/return plumbing.

Headers 38, 40 are electrically non-conductive and can be easily produced by molding or casting headers 38, 40 into desired shapes. For example, headers 38, 40 can be injection molded from a polymeric material that is capable of withstanding the acidic environments of the fluid streams. Headers 38, 40 can also be injection molded with a glass filled polypheny sulfide or a polysulfone. If desired, headers 38, 40 can be compression molded. These methods of producing headers 38, 40 facilitates the forming of passageways 46 into a desired orientation/configuration that provides a requisite transition between the supply/return plumbing and the flow headers within fuel cell stack 24. The use of a polymer for headers 38, 40 also minimizes concerns associated with thermal expansion of the various components of fuel cell assembly 20. The thermal expansion rates of end plate 32, insulator plate 34 and terminal plate 36 may vary and cause relative movement therebetween. However, headers 38, 40 pass through all of these plates to provide fluid tight communication paths between fuel cell stack 24 and the supply/return plumbing so that thermal expansion of these plates does not effect the sealing engagement of headers 38, 40.

The dry end 28 (not shown in detail) is very similar to wet end assembly 26 and includes a terminal plate that is positioned adjacent an opposite end of fuel cell stack 24 and conducts electrical current to/from fuel cell stack 24. There is also an insulator plate that is sandwiched between an end plate and the terminal plate to electrically insulate the end plate from the terminal plate. The main difference in dry end assembly 28 is that the fluid streams flowing to/from fuel cell stack 24 do not pass through dry end assembly 28. Accordingly, dry end assembly 28 does not utilize headers 38, 40 nor openings within the terminal plate, insulator plate, and end plate. However, it should be appreciated, if desired, such as when cascading two or more fuel cell assemblies together, the fuel cell assembly 20 can have two end assemblies that are both wet and allow fluid streams to flow therethrough. In this case, headers 38, 40 according to the principles of the present invention can also be utilized to isolate and protect the end plates, insulator plates and terminal plates from contact with the fluid streams.

It should be appreciated that the embodiments shown and the specific configurations therein are for illustrative purposes and are merely exemplary in nature and, thus, variations that do not depart from the gist of the invention are intended to be within the scope of the invention. For example, headers 38, 40 are shown with each having three passageways and being formed as a single integral unit. However, the headers 38, 40 can be separate components each having one or more passageways that direct the fluid streams and protect the plates from contact with these fluid streams. Additionally, the openings within the various plates are shown as being three discrete openings. However, the openings can be combined into larger openings and the passageways in the headers combined into multiple passageways that correspond to the configuration of the openings in these plates. Additionally, header 40 can be configured to have its passageways 46 flow through openings in insulator plate 54 and terminal plate 56 if those plates were to extend over top of the flow headers within fuel cell stack 24. Furthermore, it should be appreciated that extensions 36a of terminal plates 36 can extend outwardly from fuel cell assembly 20 from other locations that may or may not be adjacent to the locations of headers 38, 40. Moreover, headers according to the present invention can also be used to provide pathways through the end assemblies for instrumentation or the like, if desired, although all of the benefits of the present invention may not be realized. Accordingly, such variations are not to be regarded as a departure from the spirit and scope of the invention.

What is claimed is:

1. A fuel cell assembly comprising:
   a plurality of fuel cells arranged adjacent one another and forming a fuel cell stack;
   a terminal plate in electrically conductive contact with said fuel cell stack and operable to conduct electrical current from said fuel cell stack, said terminal plate having an opening for transporting a fluid stream to or from said fuel cell stack;
   an end plate operable to impose a compressive force on said fuel cell stack, said end plate having an opening therethrough to allow said fluid stream to flow to or from said fuel cell stack;
   an insulating plate disposed between said end plate and said terminal plate, said insulating plate electrically isolating said end plate from said terminal plate, said insulating plate having an opening therethrough to allow said fluid stream to flow to or from said fuel cell stack; and
   an electrically non-conductive header sealingly engaged with said fuel cell stack and passing through said openings in said terminal plate, said insulating plate, and said end plate, said header having a fluid transport passageway that allows said fluid stream to flow to or from said fuel cell stack through said openings in said terminal plate, said insulating plate, and said end plate, wherein said header is a component separate and distinct from said terminal plate, said insulating plate, and said end plate, and said header prevents said fluid stream from contacting said terminal plate, said insulating plate, and said end plate.

2. The fuel cell assembly of claim 1, further comprising a sealing member disposed between said header and said fuel cell stack, said sealing member providing a fluid tight engagement between said header and said fuel cell stack.

3. The fuel cell assembly of claim 2, wherein said header has a recessed portion within which said sealing member is disposed.

4. The fuel cell assembly of claim 1, wherein said terminal plate has a plurality of openings to allow a plurality of fluid streams to flow to or from said fuel cell stack, said header passes through said openings in said terminal plate, said header has a plurality of fluid transport passageways that allow said fluid streams to flow to or from said fuel cell stack through said openings in said terminal plates, and said header prevents said fluid streams from contacting said terminal plate.

5. The fuel cell assembly of claim 4, wherein said header is a single integral component with a plurality of fluid transport passageways.

6. The fuel cell assembly of claim 1, wherein said header is a polymer.

7. The fuel cell assembly of claim 1, wherein said header is injection molded.

8. The fuel cell assembly of claim 1, wherein said opening in said terminal plate, said insulating plate, and said end plate are each one of a plurality of openings that allow a plurality of fluid streams to flow to or from said fuel cell stack, and said header is at least two headers that are each sealing engaged with said fuel cell stack and each pass through at least one of said openings in said terminal plate, said insulating plate, and said end plate, each of said headers having at least one fluid transport passageway that allows a fluid stream to flow to or from said fuel cell stack through an opening in said terminal plate, said insulating plate, and said end plate, and said headers prevent said fluid streams from contacting said terminal plate, said insulating plate, and said end plate.

9. The fuel cell assembly of claim 1, wherein said header passageway is shaped in a configuration to match a shape of a fluid passageway of said fuel cell stack.

10. The fuel cell assembly of claim 1, wherein an end of said header passageway is sealingly engaged with a fluid plumbing component.

11. A fuel cell assembly comprising:
    a plurality of fuel cells arranged adjacent one another and forming a fuel cell stack;
    a terminal plate having a peripheral edge and in electrically conductive contact with said fuel cell stack and operable to conduct electrical current from said fuel cell stack;
    an end plate operable to impose a compressive force on said fuel cell stack, said end plate having in opening therethrough to allow a fluid stream to flow to or from said fuel cell stack;
    an electrically non-conductive insulating plate having a peripheral edge and disposed between said end plate and said terminal plate, said insulating plate electrically insulating said end plate from said terminal plate; and
    an electrically non-conductive header sealingly engaged with said fuel cell stack and with a fluid plumbing component, said header passing through said opening in said end plate and outside of said peripheral edge of said terminal plate, said header having a fluid transport passageway that allows said fluid stream to flow to or from said fuel cell stack through said opening in said end plate, wherein said header prevents said fluid stream from contacting said terminal plate, said insulator plate, and said end plate.

12. The fuel assembly of claim 11, further comprising a sealing member disposed between said header and said fuel cell stack, said sealing member providing a fluid tight engagement between said header and said fuel cell stack.

13. The fuel cell assembly of claim 11, wherein said header is in direct contact with said terminal plate.

14. The fuel cell assembly of claim 11, wherein said header is a single integral component with a plurality of fluid transport passageways.

15. The fuel cell assembly of claim 11, wherein said header is a polymer.

16. The fuel cell assembly of claim 11, wherein said opening in said end plate is one of a plurality of openings that allow a plurality of fluid streams to flow to or from said fuel cell stack, and said header is at least two headers that are each sealing engaged with said fuel cell stack and each passing through at least one of said openings in said end plate, each of said headers having at least one fluid transport passageway that allows a fluid stream to flow to or from said fuel cell stack through an opening in said end plate, and said headers prevent said fluid streams from contacting said terminal plate, said insulator plate and said end plate.

17. The fuel cell assembly of claim 1, wherein each one of said end plate, said insulating plate, and said terminal plate are separate and distinct components from one another.

18. The fuel cell assembly of claim 1, wherein said header is a single integral component.

19. The fuel cell assembly of claim 8, wherein said at least two headers are a single integral component.

20. The fuel cell assembly of claim 11, wherein said header extends from said end plate to said fuel cell stack outside of said peripheral edge of said insulating plate.

21. The fuel cell assembly of claim 11, wherein said header is a component separate and distinct from said terminal plate, said insulating plate, and said end plate.

22. The fuel cell assembly of claim 13, wherein said header is in direct contact with said peripheral edge of said terminal plate.

23. The fuel cell assembly of claim 16, wherein said at least two headers are a single integral component.

24. A fuel cell assembly comprising:
a plurality of fuel cells arranged adjacent one another and forming a fuel cell stack;
a terminal plate having opposite first and second ends with a length therebetween, said terminal plate in electrically conductive contact with said fuel cell stack and operable to conduct electrical current from said fuel cell stack;
an end plate having opposite first and second ends with a length therebetween, said end plate operable to impose a compressive force on said fuel cell stack, and said end plate having first and second openings therethrough adjacent said first and second ends to allow a fluid stream to flow to or from said fuel cell stack; and
first and second electrically non-conductive headers sealingly engaged with said fuel cell stack, said first and second headers respectively passing through said first and second openings in said end plate, said first and second headers each having a fluid transport passageway that allows said fluid stream to flow to or from said fuel cell stack through said first and second openings in said end plate, wherein said first and second headers prevent said fluid stream from contacting said terminal plate and said end plate, said terminal plate has an opening therethrough adjacent said first end and aligned with said first opening in said end plate, said first header passes through said first openings in said end plate and said terminal plate while said second header passes along said terminal plate outside of said second end, and said first and second headers are each components separate and distinct from one another and from said end plate and said terminal plate.

25. The fuel cell assembly of claim 24, further comprising an electrically non-conductive insulating plate having opposite first and second ends and a length therebetween, said insulating plate having an opening adjacent said first end and being disposed between said end plate and said terminal plate with said opening in said insulating plate aligned with said openings in said terminal plate and said end plate, said insulating plate electrically insulating said end plate from said terminal plate, and said first header passing through said openings in said end plate, said insulating plate, and said terminal plate adjacent said first ends.

26. The fuel cell assembly of claim 25, wherein said second header passes along said insulating plate outside of said second end.

27. The fuel cell assembly of claim 24, wherein each of said first and second headers has a base with a projection extending outwardly therefrom, said fluid transport passageways extending through said projections and said base, and wherein said first header base has a first thickness, said second header base has a second thickness, and said second thickness is greater than said first thickness.

28. The fuel cell assembly of claim 27, wherein said second header thickness is substantially equal to a distance between a face of said fuel cell stack sealingly engaged with said second header and a facing surface of said end plate adjacent said second end.

29. The fuel cell assembly of claim 24, wherein each of said first and second headers comprises a plurality of first headers and a plurality of second headers, said openings in said end plate adjacent said first and second ends are each a plurality of first and second openings, said first headers extend through said first openings in said end plate, said second headers extend through said second openings in said end plate, and each of said headers allows a fluid stream to flow to or from said fuel cell stack through said end plate while preventing said fluid streams from contacting said terminal plate and said end plate.

* * * * *